United States Patent [19]

Donlan et al.

[11] Patent Number: 6,139,830
[45] Date of Patent: Oct. 31, 2000

[54] METHODS FOR REDUCING DEPOSIT FORMATION ON SURFACES

[75] Inventors: Rodney M. Donlan, Bridgeville; David L. Elliott, Imperial; Jasbir S. Gill, McKees Rocks; Christopher L. Wiatr, McMurray; Peter R. Ten Eyck, Wexford, all of Pa.

[73] Assignee: Calgon Corporation, Pittsburgh, Pa.

[21] Appl. No.: 08/929,980

[22] Filed: Sep. 15, 1997

Related U.S. Application Data

[60] Provisional application No. 60/026,844, Sep. 27, 1996, and provisional application No. 60/026,909, Sep. 27, 1996.

[51] Int. Cl.$^7$ ................................................... A01N 25/10
[52] U.S. Cl. .................. 424/78.09; 424/405; 424/78.18; 424/78.31; 514/705
[58] Field of Search ........................ 523/122; 424/78.09, 424/405, 406, 76.8, 78.18, 78.31; 514/693, 705

[56] References Cited

U.S. PATENT DOCUMENTS

| | | | |
|---|---|---|---|
| 4,936,987 | 6/1990 | Persinson et al. | 210/699 |
| 5,132,306 | 7/1992 | Hsu . | |
| 5,453,275 | 9/1995 | Terry et al. . | |
| 5,466,437 | 11/1995 | Gaffar et al. . | |
| 5,573,641 | 11/1996 | Meade et al. | 162/158 |
| 5,593,595 | 1/1997 | Gill | 210/700 |
| 5,670,055 | 9/1997 | Yu et al. | 210/698 |

FOREIGN PATENT DOCUMENTS

| | | |
|---|---|---|
| 1269584 | 5/1990 | Canada . |
| 249854 | 12/1989 | Czechoslovakia . |
| 0385676 | 9/1990 | European Pat. Off. . |
| 2218708 | 11/1989 | United Kingdom . |
| WO93/06180 | 4/1993 | WIPO . |

OTHER PUBLICATIONS

T. Tashiro, Removal of *Escherichia coli* from water by systems based on insoluble polystyrene–poly (ethylene glycol)s,—polyethylenimines, and—polyethylenepolyamines quaternized), *J. Applied Polymer Science*, vol. 43, 1369–1377 (1991).

H. Ridgway et al., "Bacterial adhesion and filing of reverse osmosis membranes", *Research and Technology* (Jul. 1985), 97–106.

D. Blainey and K. Marshall, "The Use of Block Coploymers To Inhibit Bacterial Adhesion and Biofilm Formation on Hydrophobic Surfaces in Marine Habitats", *Biofouling*, 1991, vol. 4, pp. 309–318.

C.Wiater, "Development of Biofilms", TAPPI Proceedings: 1994 *Biological Sciences Symposium*, 203–223.

L. Robertson, "Prevention of Microbial Adhesion", *TAPPI Proceedings: 1994 Biological Sciences Symposium*, 225–232.

L. Robertson and N. Taylor, "Biofilms and Disbursents: A Less–Toxic Approach to Deposit Control", *TAPPI Journal* Apr. 1994, vol. 77, No. 4, 99–103.

(List continued on next page.)

*Primary Examiner*—Neil S. Levy
*Attorney, Agent, or Firm*—Walter C. Danison; Thomas M. Breininger

[57] ABSTRACT

A method for reducing formation of deposits on a surface in contact with an aqueous system includes applying to the surface a composition comprising a polyoxypropylene-polyoxyethylene block copolymer and a biocide. The composition optionally may also include a dispersant.

2 Claims, 4 Drawing Sheets

OTHER PUBLICATIONS

Abstract Accession No. 79:100956 CA, "Inhibition of Staphylococcus Aureus by Combinations of Non–Ionic Surface Active Agents and Antibacterial Substances", Authored by M. C. Allwood, Department of Pharmacy, University of Manchester, Manchester, England, *Microbios* (1973), 7(28), 209–214.

M. J. Bridgett et al., "Control of Staphylococcal Adhesion to Polystyrene Surfaces by Polymer Surface Modification With Surfactants", *Biomaterials* 1992, Vol. 13, No. 7, pp. 411–416.

M. Humphries et al., "The Use of Non–Ionic Ethoxylated Propoxylated Surfactants to Prevent the Adhesion of Bacteria to Solid Surfaces", *FEMS Microbiology Letters* 42 (1987) 91–101.

"Krajowy dyspergator osadów do uxdatniania chlodzacej wody obiegowej w przemyśle chemicznym", *Przemysl Chemiczny*, 68/12 (1989), 544–546.

M. Humphries, et al., "the effect of a range of biological polymers and synthetic surfactants on the adhesion of a marine Pseudomonas sp. strain NCMB 2021 to hydrophilic and hydrophobic surfaces", *FEMS Microbiology Ecology* 38(1986), p. 299–308.

METHODS FOR REDUCING DEPOSIT FORMATION ON SURFACES

This application claims the benefit of U.S. Provisional Application Ser. Nos.

STATEMENT REGARDING FEDERALLY SPONSORED RESEARCH OR DEVELOPMENT

Not applicable.

TECHNICAL FIELD AND INDUSTRIAL APPLICABILITY OF THE INVENTION

The present invention is directed to compositions and methods useful for reducing the formation and growth of deposits on surfaces in contact with aqueous media. More particularly, the present invention is directed to multi-component compositions and to methods of using those compositions to reduce the occurrence of deposits of water-borne matter, for example, silt and microorganisms, on surfaces in contact with aqueous systems. The compositions and methods of the present invention find application in any environment wherein a surface contacts an aqueous medium. Such environments include, for example, paper mills and paper processing operations and in once-through and recirculating water cooling systems.

BACKGROUND OF THE INVENTION

Over the past approximately 20 years, high efficiency fill material in the form of thin sheets of PVC has been used as cooling tower fill media. See J. S. Gill et al., "Fouling of Film Forming Cooling Tower Fills—A Mechanistic Approach", Cooling Tower Institute Annual Meeting (Houston, Tex., 1994). Because of its greater heat transfer efficiency and lower weight it has been received favorably by the industry. A problem with this fill material is that it has a tendency to foul rapidly with water borne materials and develops significant deposits commonly containing microorganisms and silt. Studies have shown that the microorganisms provide a matrix or "glue" for further deposition of silt, primarily clay, especially when the makeup is from a fresh water surface supply. Id. It is common for biofilms in industrial water systems to collect or capture abiotic particles including clay particles. See E. J. Bower, "Theoretical Investigation of Particle Deposition in Biofilm Systems", Water Research, 21:1489–1498 (1987); W. J. Drury et al., "Interactions of 1 $\mu$m Latex Particles in Pseudomonas aeruginosa Biofilms", Water Research, 27:1119–1126 (1993); W. J. Drury et al., "Transport of 1 $\mu$m Latex Particles in Pseudomonas aeruginosa Biofilms", Biotechnol. Bioeng., 42:111–117 (1993); W. G. Characklis, "Microbial Fouling", in W. G. Characklis and K. C. Marshall (eds.), Biofilms, pp. 523–584 (John Wiley, New York, 1990). In the case of clay crystals, Marshall, in Interfaces in Microbial Ecology, (Harvard Univ. Press, Cambridge, Mass., 1976), presented electron microscopic evidence of clay-bacterial associations. He presented results indicating that the clay crystals associated in an edge-to-edge manner to carboxyl-type bacterial surfaces, with the positively-charged edges of the clay crystal attracted to the negatively charged bacterial surface. These observations were supported by J. S. Gill et al., supra, in which a complex scanning electron microscopic procedure was used to view bacterial-clay interactions on the PVC fill surface.

Different treatments have been proposed to control fouling of PVC fill material in recirculating cooling water. Pearson, et al., "Cleaning and Maintenance of Film Fill at Florida Power Corporation", Cooling Tower Institute Annual Meeting, 1992, Technical Paper No. TP92-09, utilized a 60% acrylic acid, 40% 2-acrylamido-2-methylpropylsulfonic acid (AA/AMPS copolymer) to control the fouling onto pvc fill material in a seawater fed system. Mortensen and Conley, "Film Fill Fouling in Counterflow Cooling Towers: Research Results", National Association of Corrosion Engineers Annual Meeting, 1994, Paper No. 457, recommended microbiological control with the use of microbiocides and with possible pretreatment of the makeup water using some type of clarification.

Others have documented that nonionic surfactants may affect the adhesion of bacteria to surfaces. L. R. Robertson, "Prevention of Microbial Adhesion", Biological Sciences Symposium, TAPPI Proceedings, Minneapolis, MN, Oct. 3–6, 1994, pp. 225–232; C. L. Wiatr, "Development of Biofilms", Biological Sciences Symposium, TAPPI Proceedings, Minneapolis, Minn., Oct. 3–6, 1994, pp. 225–232; B. L. Blainey and K. C. Marshall, "The Use of Block Copolymers to Inhibit Bacterial Adhesion and Biofilm Formation on Hydrophobic Surfaces in Marine Habitates", Biofouling, 4: 309–318 (1991); J. H. Paul and Jeffrey, "Evidence for Separate Adhesion Mechanisms for Hydrophilic and Hydrophobic Surfaces in Vibrio proteolytica", Appl. Environ. Microbiol., 50: 431–437 (1985); W. K. Whitekettle, "Effects of Surface-Active Chemicals on Microbial Adhesion", Jour. Indust. Micrbiol., 7: 105–116 (1991); H. F. Ridgeway et al., "Bacterial Adhesion and Fouling of Reverse Osmosis Membranes", Journal AWWA, July, 1985, pp. 97–106; J. Olsson et al., "Surface Modification of Hydroxyapatite to Avoid Bacterial Adhesion", Colloid Polym. Sci., 269 (12): 1295–1302 (1991).

SUMMARY OF THE INVENTION

The present inventors have discovered a method for reducing the formation of deposits of water-borne materials such as, for example, silt and microorganisms, on surfaces in contact with aqueous systems. The method comprises applying to the particular surface an amount of a multi-component composition comprising a polyoxypropylene-polyoxyethylene block copolymer and a biocide. Examples of the possible biocide component of the composition include glutaraldehyde, quaternary ammonium compounds, isothiazoline, carbamates, dibromonitrilopropionamide, and dodecylguanidine hydrochloride. The composition may also include a dispersant such as, for example, an acrylic acid/AMPS copolymer. The present invention is also directed to compositions useful in the present methods for reducing deposit formation on surfaces in contact with aqueous systems.

DETAILED DESCRIPTION OF THE INVENTION

Figure 1:
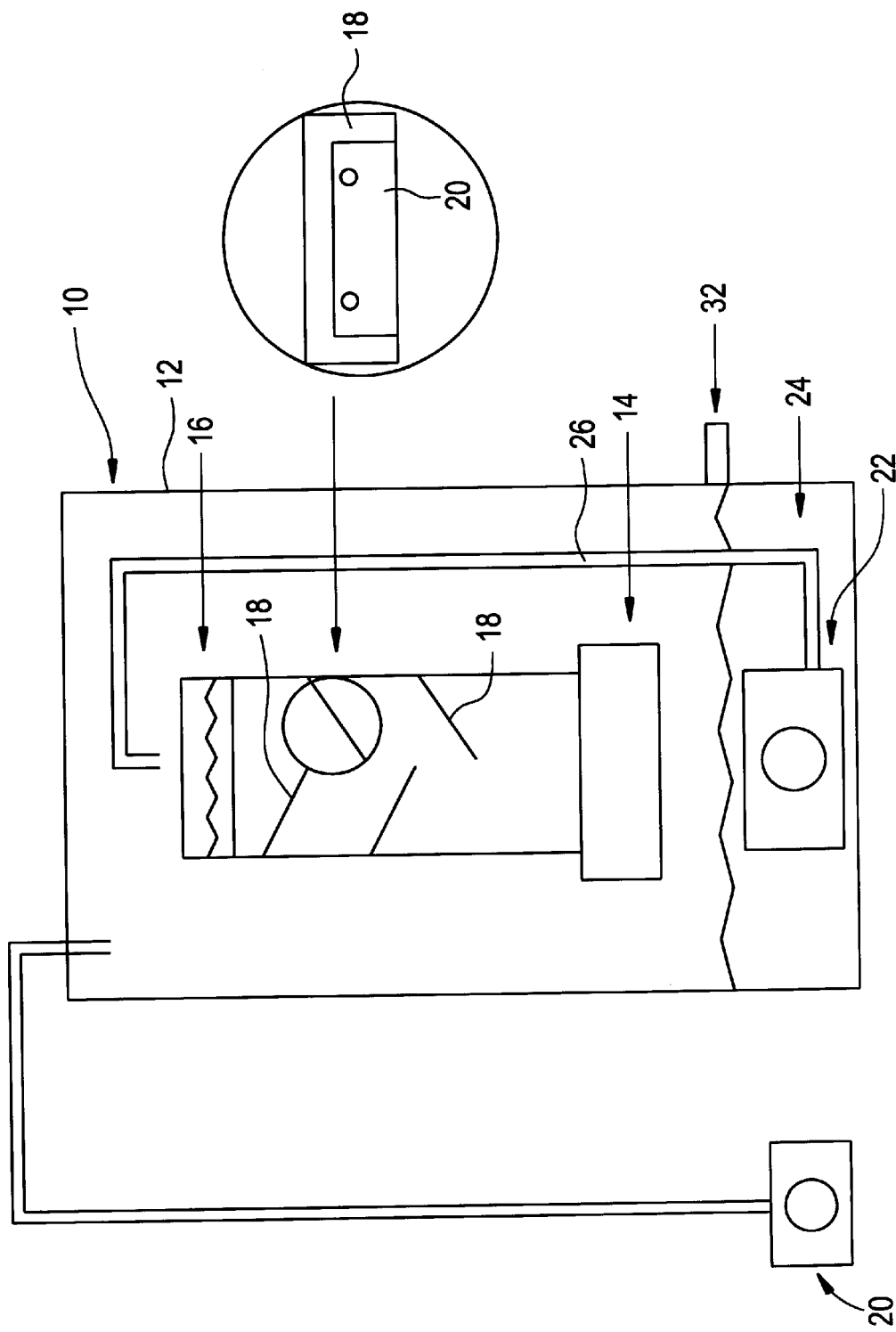
FIG. 1 is a schematic representation of the recirculating water system that the present inventors used in conducting experiments related to the invention.

Studies were initiated to investigate the effect of surfactants on bacterial adhesion. The studies' purpose was to determine whether and to what extent surfactants might minimize bacterial adherence onto PVC material. The ultimate intent was to provide the first component of a treatment scheme to minimize fill fouling by minimizing the microbial component. The studies' results indicate that nonionic surfactants of the EO/PO configuration were effective in minimizing adherence in both lab systems and under field conditions.

PVC high efficiency cooling tower fill material has been shown to foul rapidly with water-borne silt and microorganisms. The fouling deposits formed are complex and difficult to either prevent or remove. The present inventors hypothesized that deposition with clay/microorganisms might be minimized if a combination of clay dispersant-nonionic surfactant-biocide was utilized. Results, detailed below, indicated that dispersant/surfactant combinations were ineffective for controlling the fouling deposition onto nonfouled PVC fill material when exposed to natural water-borne silts from a fresh water river. However, the same results indicated that an EO/PO block copolymer nonionic surfactant alone without the dispersant but in combination with a biocide is effective in reduction of deposition onto PVC material under the same conditions. The results also showed that there was no relationship between biofilm accumulation and total deposit accumulation.

The inventors hypothesized that surfactants in combination with clay dispersants and biocides might be effective in reducing total fouling accumulation. In this case, the dispersant could reduce the rate of particle deposition onto the biofouled surface, and the biocide would reduce the number of planktonic organisms and therefore the rate of biofilm formation. An experimental design was then implemented in order to test this hypothesis. The clay dispersant used was an acrylic acid/AMPS copolymer. The biocide used was glutaraldehyde. In addition to the EO/PO surfactants, an additional nonionic surfactant mixture in combination with the clay dispersant was also tested.

The site chosen for the experimental work was a power plant located on the Monongahela River in Pennsylvania. The plant uses the river as makeup water for its recirculating cooling water. Because it is a surface water source, it would be expected to carry a variable silt load, depending upon season and weather related run-off events. Examination of many samples of fouled PVC fill material from cooling towers in the United States by Calgon laboratories revealed that those plants receiving surface water makeup from fresh water rivers in the eastern/southeastern U.S. contained a significant clay component. Experiments were then designed to expose PVC material to a side stream of Monongahela River water during Summer and Fall months, when silt loading and biofouling would be expected to peak.

I. Materials and Methods a. Apparatus and Testing Protocol

The recirculating water system (RWS) apparatus used for all experiments is shown in FIG. 1. The recirculating water system (RWS) (10) included a chamber (12) having a mini-tower (14) therein. The mini-tower (14) included a tower deck (16) and a portion below the tower deck including multiple slats (18) containing PVC fill pieces (20) as shown in the circled enlarged view of one slat in FIG. 1. The chamber (12) included a recirculating pump (22) to circulate water from 8-liter sump (24) through tubing (26). The RWS also included make-up pump (30) and blowdown (32) positioned at the 8-liter level of the sump. Recirculating water systems were installed at the power plant site. Each system contained 8 liters of Monongahela River water which was continuously added to provide a retention time of 48 hours. Water temperatures in the RWS averaged about 30° C. The flow of recirculated water over the mini-tower in the RWS was controlled by a screw clamp so that each RWS had a similar flow over the exposed fill pieces. PVC fill material was obtained from Munters Corporation (Fort Myers, Fla.). Fill pieces were cut, rinsed in ethanol then in Butterfield Buffer (pH 7.2) prior to installation.

b. Test Solutions and Treatments

All stock solutions were made up in deionized water and concentrations were based on a product weight, not on an active basis. The biocide used in this case was 45% active glutaraldehyde. Acrylic Acid/AMPS was a combination of acrylic acid (60%) and 2-acrylamido-2-methylpropylsulfonic acid (40%). For this work, a 28% active solution was used. The nonionic surfactant blend was comprised of the following components: 14.55% nonylphenoxlpolyethanol, 14.55% polyoxypropylene-polyoxyethylene block copolymer, 1.99% low molecular weight copolymer, and 0.49% 3-5 dimethyl-2H-1,3,5-thiadiazine-2-thione, 21% salt. The EO/PO surfactant was a polyoxypropylene-polyoxyethylene block copolymer obtained from BASF Corporation, Parsippany, N.J. Specifically, BASF's Pluronic P103 EO/PO surfactant was used in the present experiments. The BASF Pluronic surfactants are block copolymers of ethylene oxide (EO) and propylene oxide (PO) segments having the general structure:

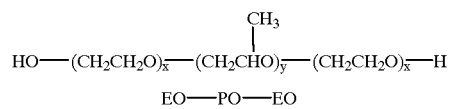

$$\text{HO}-(\text{CH}_2\text{CH}_2\text{O})_{\overline{x}}-(\text{CH}_2\overset{\overset{\displaystyle \text{CH}_3}{|}}{\text{CHO}})_{\overline{y}}-(\text{CH}_2\text{CH}_2\text{O})_{\overline{x}}-\text{H}$$

$$\text{EO}-\text{PO}-\text{EO}$$

The Pluronic F68, F108, L62D, L64, and P103 surfactants are ethylene oxide/propylene oxide block copolymers of EO-PO-EO blocks, while the Pluronic 17R8, 25R2, 25R4, and 25R8 surfactants are PO-EO-PO blocks. The Pluronic P103 surfactant has a high EO content, a molecular weight of 5000, and a hydrophobic-lipophilic balance of 7–24. Makeup to each recirculating water system was pumped continuously using a Masterflex pump (Cole Parmer, Niles, Ill.). Surfactant and dispersant solutions were made up in 20 liter Nalgene carboys by adding stock solutions to the makeup water. The biocide was added directly into the sump of each RWS at a concentration of 60 mg/L (product basis). The EO/PO surfactant and the nonionic surfactant blend products were added at a concentration of 10 mg/L (as product), and the acrylic acid/AMPS at a concentration of 30 mg/L (as the 28% product). A chemical analysis of the water collected from the sump of the RWS is shown in Table 1. Planktonic heterotrophic plate counts on water collected from the RWS averaged $2 \times 10^6$ cfu/ml for the first eight week experiment and approximately $1 \times 10^5$ cfu/ml for the second. The untreated RWS tended to have somewhat lower plate counts than the treated systems though not significantly so. Otherwise, treatments had no obvious effect on the counts.

TABLE 1

Chemical Analysis of Water Collected from Recirculating Water Systems Supplied with Monongahela River Water.

| Analyte | Concentration[1,2] |
|---|---|
| pH | 7.3 |
| Alkalinity | 44 |
| Conductivity | 610 |
| HCO3 | 54 |

TABLE 1-continued

Chemical Analysis of Water Collected from Recirculating Water Systems Supplied with Monongahela River Water.

| Analyte | Concentration[1,2] |
| --- | --- |
| Chloride | 16 |
| Nitrite | <10 |
| Nitrate | 4.0 |
| Ortho Phosphate | <4 |
| Sulfate | 240 |
| Calcium | 65 |
| Magnesium | 16 |
| Sodium | 38 |
| Potassium | 3.5 |
| Iron | <0.05 |

[1]All analyte concentrations in mg/L with the following exceptions: pH = units, alkalinity = mg/L as CaCO3, conductivity = umhos/cm.
[2]Results are for a single sample collected from the Recirculating Water System sump.

c. Biofilm and Deposit Sampling and Analysis

PVC fill pieces were collected and analyzed for biofilm parameters. FIG. 1 shows emplacement of fill pieces (20) in the RWS. Samples were collected after 8 weeks exposure to the treatment. After the exposure interval, 3 fill pieces, each taken from a different level in the mini-cooling tower, were removed and processed. For biofilm analysis, fill sample biofilms were analyzed for ATP by placing fill pieces into sterile glass tubes containing a homogenization solution and vortexed on a Vortex Genie Mixer (Fisher Scientific, Pittsburgh, Pa.) at a setting of 10 for 1 minute. For ATP determination an aliquot of this biofilm suspension was extracted in boiling Tris Buffer (2.43 grams per Liter) for 5 minutes, then combined with HEPES buffer (Turner Design, Sunnyvale, Calif.) and Luciferin/Luciferase (Turner Design, Sunnyvale, Calif.) to determine relative light output. Relative light units were then calibrated against a $4 \times 10^{-4}$ $\mu$g external ATP standard (Turner Design, Sunnyvale, Calif.).

Fill samples were also analyzed for deposit weight as follows. Each fill piece was removed from the RWS, dried at 105° C. overnight, cooled in a desiccator and weighed. It was then washed in a detergent solution, rinsed in deionized water and redried for several hours at 105° C. The fill piece was then weighed. The difference between weights was determined to be the deposit weight. Weights were calculated per gram of clean fill weight.

II. Experimental Results a. Effect of Treatments on Deposit Formation

Figure 2:
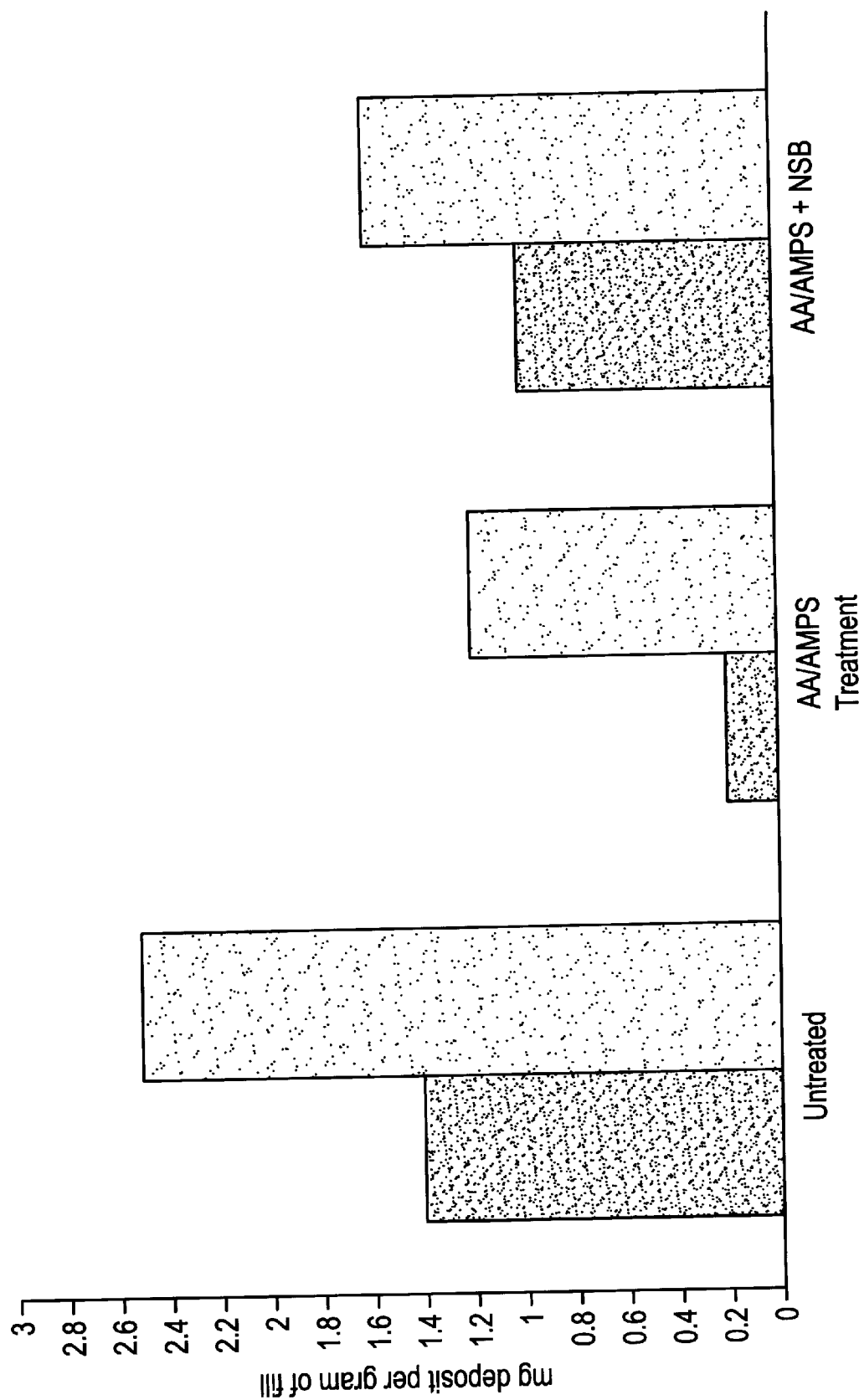
FIGS. 2 and 3 are graphs depicting the weight of deposit (mg deposit) per gram of PVC fill as a function of the experimental treatment used.
Figure 3:
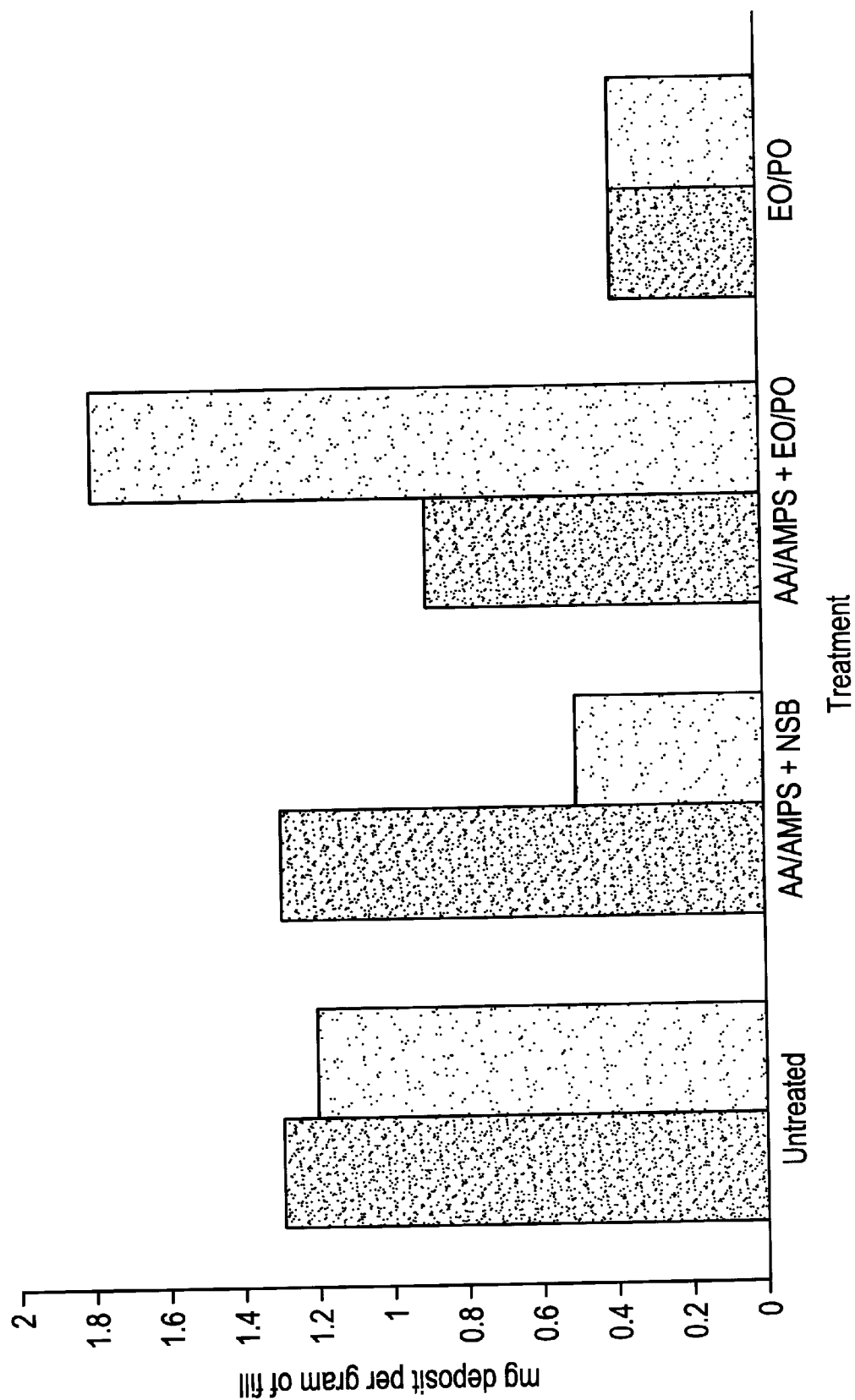

FIGS. 2 and 3 show the effect of treatments on deposit formation. Data shown in FIG. 2 were collected during an eight week exposure period in July and August, while data shown in FIG. 3 were collected during an eight week exposure in October and November. Each bar represents results for a separate RWS. AA/AMPS was the acrylic acid/AMPS copolymer, NSB the nonionic surfactant blend, EO/PO the EO/PO block copolymer treatment. All treated systems were also treated with the glutaraldehyde biocide. Analysis of variance of the data indicates that the EO/PO surfactant plus 45% glutaraldehyde biocide treatment provided a statistically significant reduction in fouling deposition (alpha 0.05). None of the other treatments provided a statistically significant reduction in deposit formation.

b. Effect of Treatments on Biofilm Formation

Tables 2 and 3 below show the effect of treatments on biofilm ATP concentrations. As in FIGS. 2 and 3, these data represent results from two separate experiments. Data shown in Table 2 were collected at the completion of an experiment run in July and August; data in Table 3 from an experiment performed in October and November. The data was highly variable and did not indicate that any of the treatments provided a significant reduction in biofilm ATP levels.

TABLE 2

Biofilm Formation Onto PVC Fill As a Function of Treatment in Monongahela River Water for 8 Weeks Exposure.

| | Nanograms ATP/cm$^2$ | |
| --- | --- | --- |
| Treatment[1] | Mean[4] | S.D.[4] |
| AA/AMPS[2] (30 ppm) | 1.82 | 0.47 |
| AA/AMPS[2] (30 ppm) | 0.43 | 0.08 |
| AA/AMPS (30 ppm) + NSB[3] (10 ppm) | 0.41 | 0.24 |
| AA/AMPS (30 ppm) + NSB[3] (10 ppm) | 1.35 | 0.38 |
| Untreated | 2.71 | 0.20 |
| Untreated | 1.39 | 0.30 |

[1]45% active glutaraldehyde biocide was added on an intermittant basis each Monday, Wednesday, and Friday at 60 ppm to all treated systems.
[2]Acrylic Acid/AMPS copolymer.
[3]Acrylic Acid/AMPS copolymer plus nonionic surfactant blend.
[4]N for all determinations was 3.

TABLE 3

Biofilm Formation Onto PVC Fill As a Function of Treatment in Monongahela River Water for 8 Weeks Exposure.

| | Nanograms ATP/cm$^2$ | |
| --- | --- | --- |
| Treatment[1] | Mean[5] | S.D.[5] |
| EO/PO[2] (10 ppm) | 0.95 | 0.14 |
| EO/PO[2] (10 ppm) | 2.25 | 0.48 |
| EO/PO (10 ppm) + AA/AMPS[3] (30 ppm) | 0.81 | 0.04 |
| EO/PO (10 ppm) + AA/AMPS[3] (30 ppm) | 3.09 | 0.19 |
| NSB (10 ppm) + AA/AMPS[4] (30 ppm) | 0.61 | 0.13 |
| NSB (10 ppm) + AA/AMPS[4] (30 ppm) | 0.82 | 0.08 |
| Untreated | 0.58 | 0.06 |
| Untreated | 2.93 | 2.48 |

[1]45% active glutaraldehyde biocide was added on an intermittant basis each Monday, Wednesday, and Friday at 60 ppm to all treated systems.
[2]The EO/PO surfactant Pluronic P103.
[3]EO/PO surfactant plus the acrylic acid/AMPS copolymer.
[4]The nonionic surfactant blend plus acrylic acid/AMPS copolymer.
[5]N for all determinations was 3.

c. Relationship Between Deposit and Biofilm Formation

Figure 4:
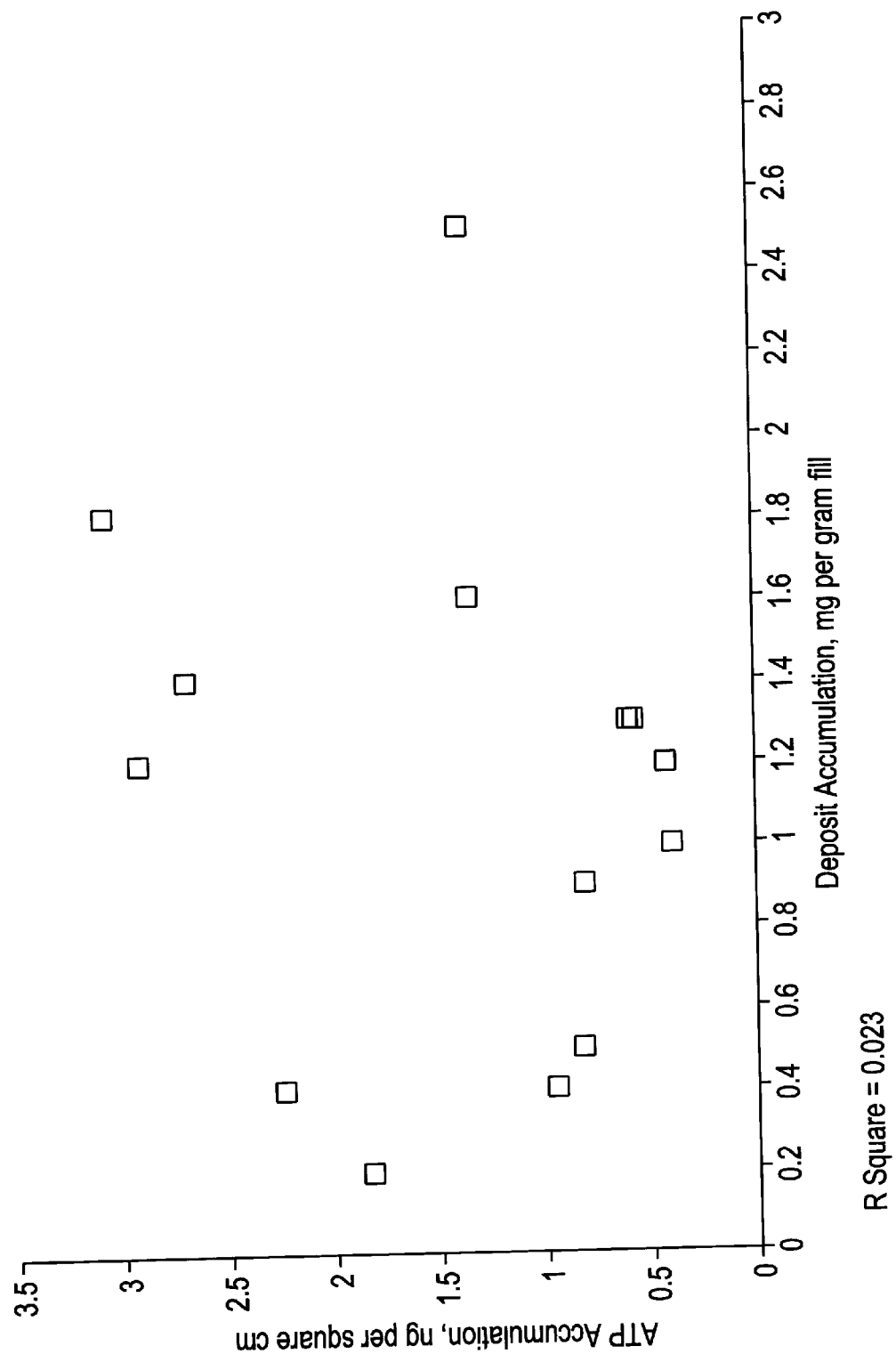
FIG. 4 is a plot showing the linear regression of the relationship between ATP accumulation and deposit accumulation onto PVC fill material exposed to Monongahela River water for 8 weeks.

FIG. 4 shows the linear regression of the relationship between ATP accumulation and deposit accumulation on fill material. The R square value of 0.023 indicates essentially no correlation between these two measured variables.

III. Discussion

The inventors' original hypothesis that a dispersant/surfactant/biocide combination would reduce the extent of deposit formation on fill surfaces cannot be supported by the above results. In the case where the acrylic acid/AMPS copolymer was combined with either the combination nonionic surfactant (FIGS. 2, 3) or the EO/PO surfactant (FIG. 3) and the glutaraldehyde biocide, there was not significant reduction in deposit accumulation. The contrary was true for the systems treated with the EO/PO surfactant plus biocide (FIG. 4). These results show a 69% reduction in deposit formation compared to the untreated control systems. It appears that the EO/PO surfactant may be exhibiting dispersant properties, since there was no measured reduction in microbial adhesion by the treatment. The data presented here demonstrate that treatment with the surfactant does in fact reduce silt accumulation onto the PVC surfaces.

Because biofilm formation is an integral aspect of fouling deposition, it is believed that a treatment program should also address this aspect. Eager et al., "Glutaraldehyde: Factors Important for Microbiological Efficacy", Third Conference on Progress In Chemical Disinfection, Apr. 3–5, 1986, Binghamton, N.Y. presented data indicating that much higher levels of glutaraldehyde are required to minimize or control biofilm formation (no effect level of 20 ppm active) than for planktonic bacteria. On a product basis, this will equate to about 44 mg/L (45% active glutaraldehyde). However, their data measured glucose uptake of bacteria in biofilms as a function of treatment. Dosage required to minimize bacterial adherence may be much higher. The results from this study show that the glutaraldehyde biocide, at the concentration/dosage used, was ineffective in reducing biofilm accumulation onto the PVC fill surfaces. Even though the dosage used may be considered adequate for control of planktonic bacteria, it appears that the accumulated biotic and abiotic components of the biofilm limited the efficacy of this product.

The EO/PO surfactant dosage in this study (10 mg/L) was below the level shown to be effective in earlier studies with surfactant alone for prevention of bacterial adhesion, which showed that between 30 and 50 mg/L were requires, and that this reduction in adhesion was beneficial for only the first approximately thirty days of exposure. Results of the present study support those conclusions. Biofilm ATP concentrations were unaffected by the treatment in the present inventors' studies, even with the supplemental biocide. It would appear that the effect of the EO/PO surfactant in reducing deposit accumulation is not due primarily to an effect on bacterial adhesion but rather to the control of clay deposition, either by dispersing that clay prior to association with the biofilms, or somehow reducing the efficiency with which it sticks to the biofilm surface.

Though this treatment has been shown to be effective for a very specific application, it would be expected to work equally well wherever there is a need to limit the buildup of silt/clay deposits on surfaces in industrial processes. Potentially this might include applications in the following industries/applications: paper process, recirculating and once through cooling, surface treatment, food and beverage processes, pasteurizers, preservation of water-based paints, and in the processing of clay slurries. In all these aforementioned examples, microorganisms are known to adhere firmly to surfaces and are recalcitrant to biocides. Clay particles, either introduced by the process or as a contaminant, could potentially stick to the conditioned surfaces.

In the paper process area, as paper mills increasingly utilize recycling for environmental and economic reasons, there is a greater need to control the rate of solids deposition. Slime formation in paper machine lines would be expected to provide sites for abiotic particle association, including silt and clay. This treatment could potentially minimize this problem. Treating the water used for washing felts in papermills is another possible application, since slime deposit on the felts commonly contain both microorganisms and inorganic components.

In water-based paints, which contain clay fillers and other inorganics, biocides are required as preservatives. The surfactant-biocide combination could potentially be more effective than biocide alone. In plastics or composites which contain clay fillers, this combination could serve as a processing aid to control deposits and microbial growth.

Spray washers used for metal cleaning and surface finishing may have resulting buildup of soil deposits and bacterial growth. Household and industrial washers may have a similar buildup. The surfactant-biocide combination may help to control this problem in each of these systems.

In the manufacture of ceramics and sanitary ware, clay and other inorganics are molded in a water-borne process, followed by heating and other final steps. Clay is also used as a filler in plastics or composites. In both cases, the use of the surfactant in combination with the biocide may serve as a processing aid to control deposition and microbial growth. These surfactants combined with appropriate biocides might be useful as dental antiplaque agents, where bacterial growth and inorganic deposits form on dental surfaces. Alternatively, these may be useful in denture adhesives, which are water-borne materials often containing inorganic fillers like clay. Finally, this technology may inhibit fouling of water craft, ships, or other structures which reside in water, where it is necessary to prevent attachment of organisms.

It would be expected that other biocides besides glutaraldehyde might work equally well in these applications, when used at concentrations adequate to kill biofilm bacteria. Such biocides might include quaternary ammonium compounds, isothiazoline, carbamates, DBNPA (dibromonitrilopropionamide), or dodecylguanidine hydrochloride (DGH). As well, nonionic surfactants of the EO/PO configuration other than Pluronic P103 would be expected to act in similar fashion.

We claim:

1. A method for reducing the formation of deposits of one or more of water-borne silt, water-borne clay and water-borne microorganisms, on a hydrophobic surface in contact with a recirculating aqueous system, the method comprising the steps of:

making a stock solution comprising a polyoxypropylene-polyoxyethylene block copolymer, an acrylic acid/2-acrylamido-2-methylpropylsulfonic acid copolymer and water;

adding glutaraldehyde to the sump of said recirculating aqueous system such that the concentration of said glutaraldehyde in said recirculating aqueous system is about 27 ppm to about 60 ppm on an active basis; and adding said stock solution to the makeup water of said recirculating aqueous system such that the concentration of said polyoxypropylene-polyoxyethylene block copolymer in said recirculating aqueous system is about 10 ppm to about 50 ppm and the concentration of said acrylic acid/2-acrylamido-2-methylpropylsulfonic acid copolymer in said recirculating aqueous system is at least 30 ppm.

2. A method for reducing the formation of deposits of one or more of water-borne silt, water-borne clay and water-borne microorganisms, on a hydrophobic surface in contact with a recirculating aqueous system, the method consisting of the steps of:

making a stock solution consisting essentially of a polyoxypropylene-polyoxyethylene block copolymer, an acrylic acid/2-acrylamido-2-methylpropylsulfonic acid copolymer and water;

adding glutaraldehyde to the sump of said recirculating aqueous system such that the concentration of said glutaraldehyde in said recirculating aqueous system is about 27 ppm to about 60 ppm on an active basis; and adding said stock solution to the makeup water of said recirculating aqueous system such that the concentration of said polyoxypropylene-polyoxyethylene block copolymer in said recirculating aqueous system is about 10 ppm to about 50 ppm and the concentration of said acrylic acid/2-acrylamido-2-methylpropylsulfonic acid copolymer in said recirculating aqueous system is at least 30 ppm.

* * * * *